Oct. 12, 1937.                R. W. STENCEL                2,095,422
                               TRUSS BEAM
                           Filed Jan. 17, 1933           5 Sheets-Sheet 1

INVENTOR.
R. W. Stencel.
By E. J. Fetherstonhaugh
ATTORNEY.

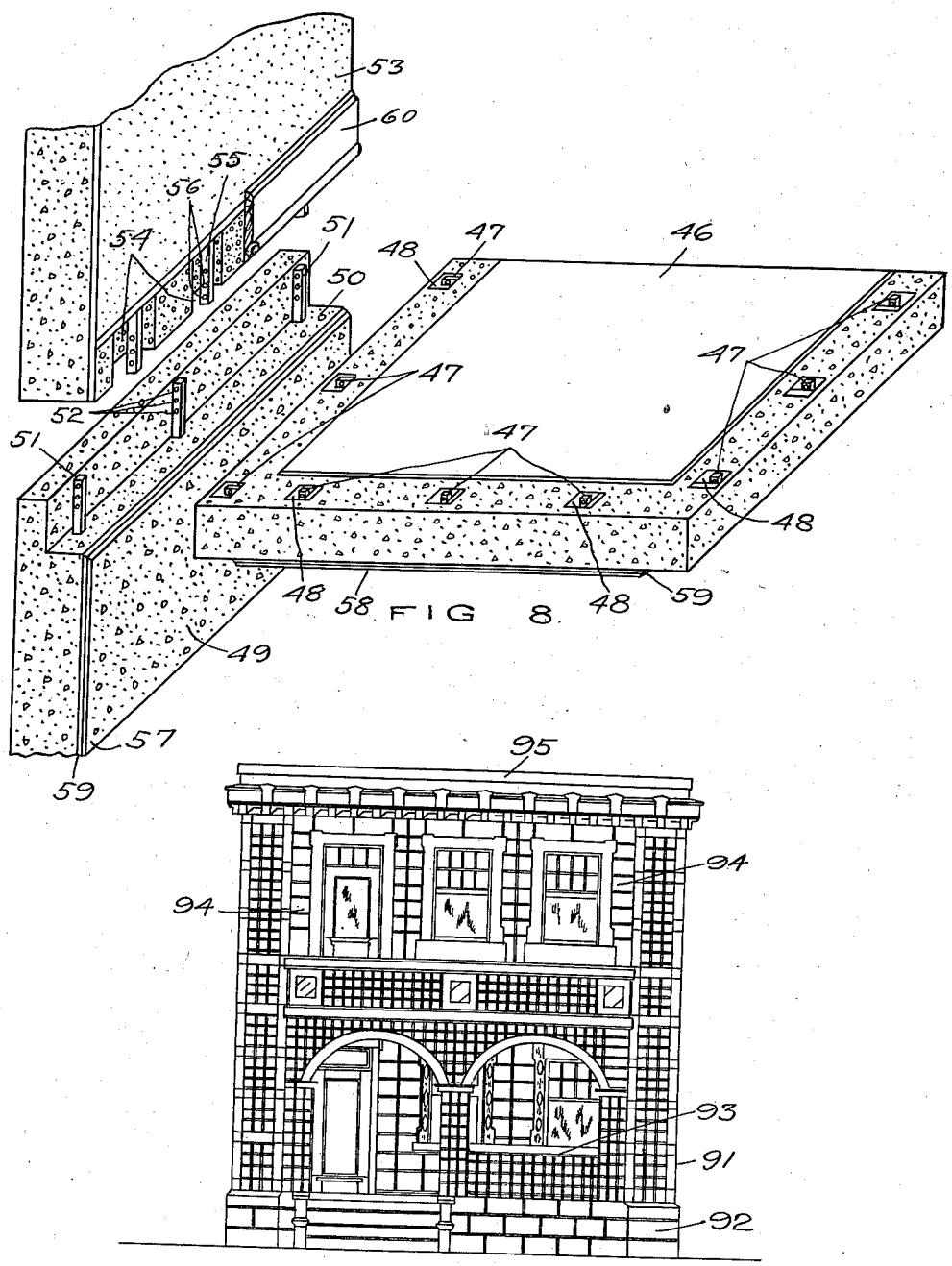

Oct. 12, 1937.   R. W. STENCEL   2,095,422
TRUSS BEAM
Filed Jan. 17, 1933   5 Sheets-Sheet 3

INVENTOR
R. W. Stencel.
By E. J. Fetherstonhaugh.
ATTORNEY.

Oct. 12, 1937.   R. W. STENCEL   2,095,422
TRUSS BEAM
Filed Jan. 17, 1933   5 Sheets-Sheet 4
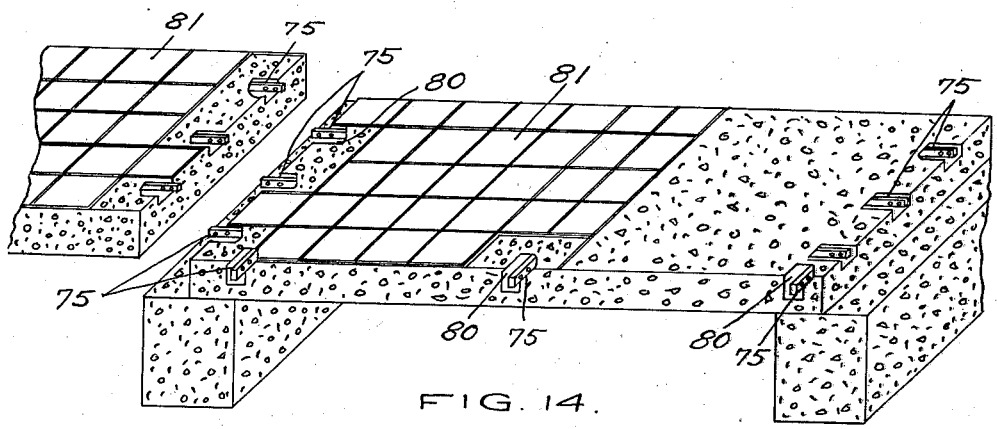
FIG. 14.
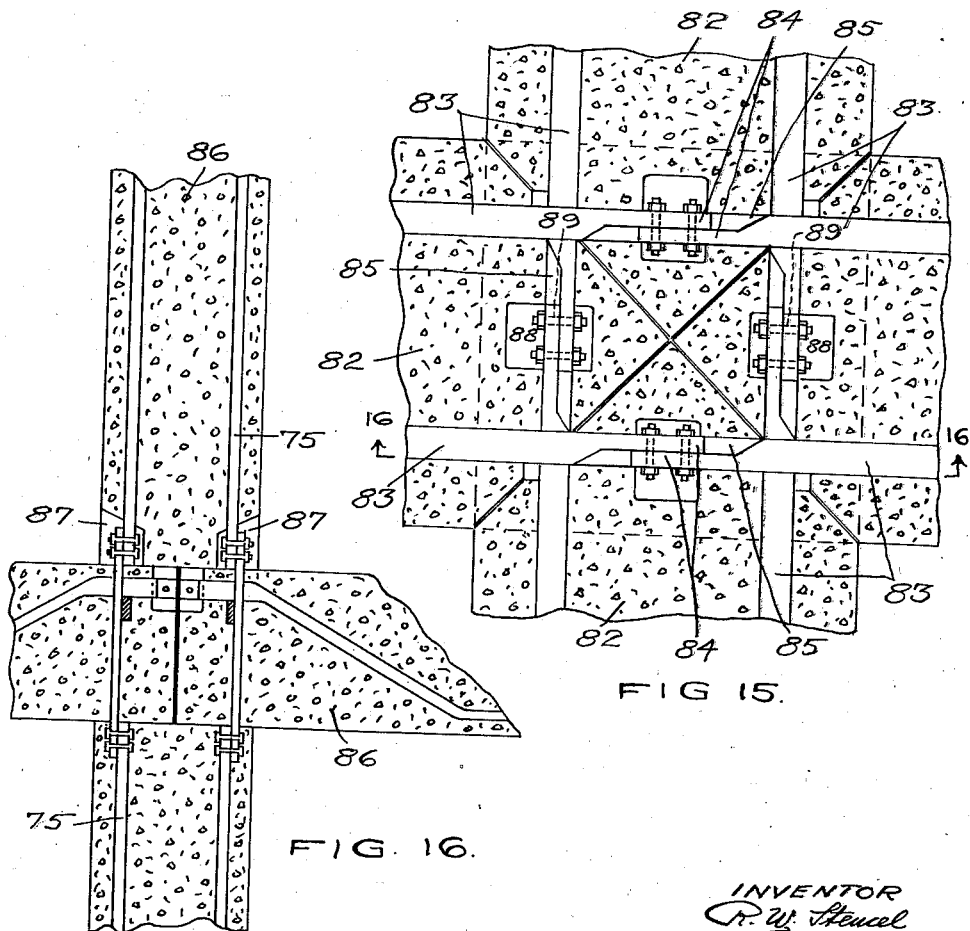
FIG. 15.
FIG. 16.
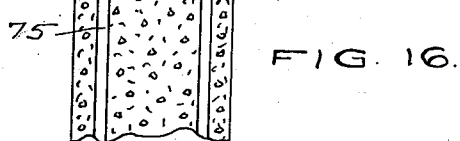

Oct. 12, 1937.  R. W. STENCEL  2,095,422
TRUSS BEAM
Filed Jan. 17, 1933   5 Sheets-Sheet 5

INVENTOR
R. W. Stencel.
By E. J. Fetherstonhaugh,
ATTORNEY.

Patented Oct. 12, 1937

2,095,422

UNITED STATES PATENT OFFICE 2,095,422

TRUSS BEAM

Robert Waldemar Stencel, Lachine, Quebec, Canada

Application January 17, 1933, Serial No. 652,113

2 Claims. (Cl. 72—61)

The invention relates to truss beams, as described in the present specification and illustrated in the accompanying drawings that form part of the same.

The invention consists essentially in the composite blocks, the concrete beams and their joint members in the construction of building sections, as pointed out in the claims for novelty following a detailed description of the blocks, the beams, the fasteners and the sections.

The objects of the invention are to eliminate the great expense of labor and forms utilized at the actual work, and in place furnish the beams and if necessary the walls, as well as fitting a particular block to foundation work and meeting all the exigencies of the work in hand; to facilitate the erection of the concrete type of dwelling or other building by delivering all the parts direct to the builder and simply putting them together which last act is accomplished in the joints forming permanent parts of the beam and interchangeable throughout, thus enabling the builder to proceed with his construction without the necessity of having highly skilled men, merely what may be called intelligent laborers; to maintain the highest efficiency in the finished house and insure openings and passages for every modern convenience besides enhancing the appearance of the finished structure; and generally to provide in cement and concrete construction work a truss beam having the truss rods disclosed in registering recesses and matching in said recesses for riveting or other fastening in order to bring the ends together in assembling at the particular job.

In the drawings, Figure 1 is a perspective view of the connecting bars for the type of concrete beam illustrated in Figures 2 and 3.

Figure 8 is a perspective view showing three units ready to be connected together.

Figure 9 is an elevational view of the finished house.

Figure 14 is a fragmentary perspective view of two floor sections ready for connection.

Figure 15 is a fragmentary cross-sectional plan view showing a method of connecting a number of beams incorporating the reinforcing rods shown in Figure 13.

Figure 16 is a cross sectional view on the line 16—16 in Figure 15.

Like numerals of reference indicate corresponding parts in the various figures.

Figure 1:
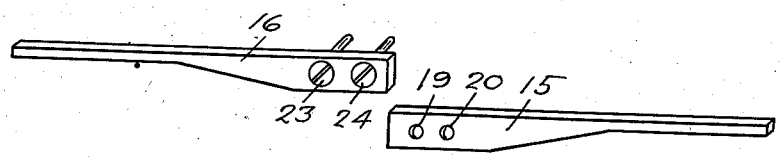

Referring to the drawings, the various concrete sections are connected by bolting steel bars together. The steel bars 15 and 16 are laid in various concrete units in the factory, and have their ends 17 and 18 projecting from the top, bottom or side of the unit according to the use made of said unit, the projecting ends 17 and 18 are made wider and heavier to insure a strong connection.

The bolt holes 19, 20, 21 and 22 are made in the connecting ends for the bolts 23 and 24, said bolts having the nuts 25 and 26.

Figures 2, 3:
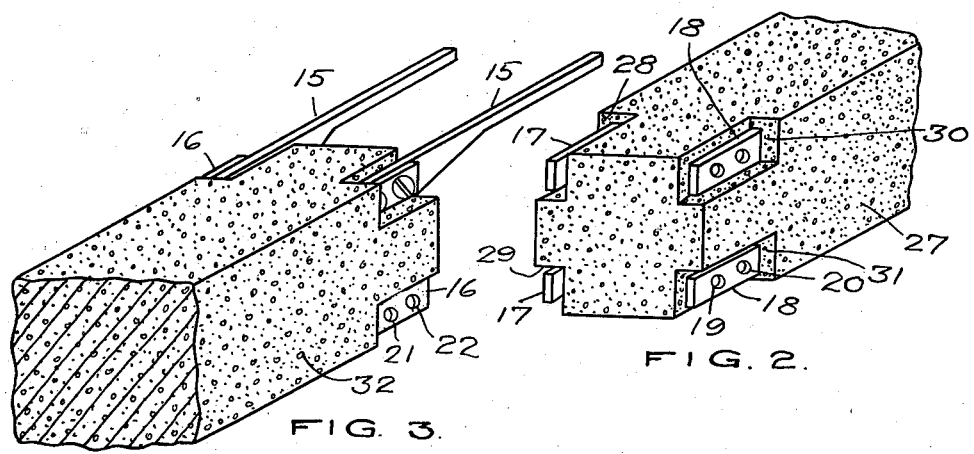
Figure 2 is a perspective view of a concrete beam having four connecting rods.
Figure 3 is a perspective view of a concrete beam similar to the one shown in Figure 2 and showing how the connecting bars are secured together.

Figure 2 shows a concrete beam 27 with the bolting recesses 28, 29, 30 and 31, the connecting ends of the steel bars 15 projecting from the beam 22 in said recesses 28, 29, 30 and 31 and ready to be bolted to the steel bars 16, projecting from a similar beam 32 shown in Figure 3. The steel bars can be riveted or welded together instead of bolted and the concrete beams can be connected to one another or to wall, beam, column, floor or roof sections.

Figure 4:
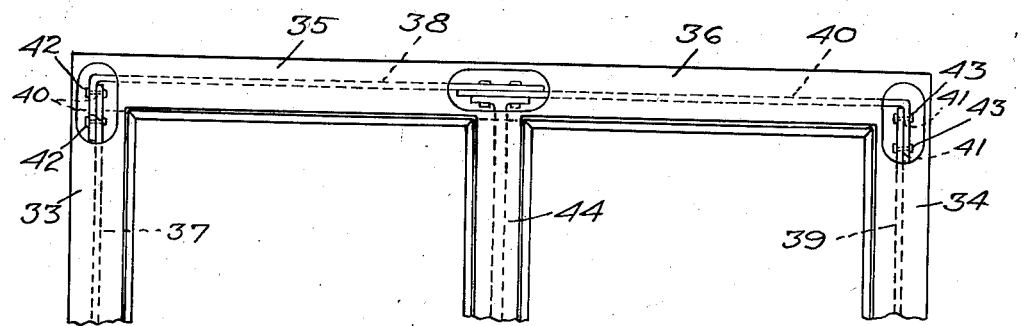
Figure 4 is a plan view showing a method of joining concrete sections together.

In Figure 4 the wall sections 33 and 34 are connected to the wall sections 35 and 36 by bolting the projecting bar 37 of the wall sections 33 to the projecting bar 38 of the wall sections 35, and the bar 39 of the wall section 34 to the bar 40 of the wall section 36, at the corner joints the bars 38 and 40 are bent at right angles over the bars 37 and 39 and bolted with the bolts 40 and 41 and the nuts 42 and 43 respectively. The partition wall or inner wall 44 is connected to the wall sections 35 and 36 by bolting the projecting T-bar from said wall 44 to the bars 38 and 40 of the wall sections 38 and 40.

Figures 5, 6:
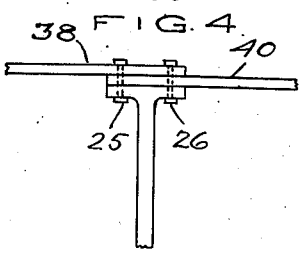
Figure 5 is an enlarged fragmentary detail of a reinforced corner joint.
Figure 6 is an enlarged fragmentary detail of a partition wall joint.
Figure 7:
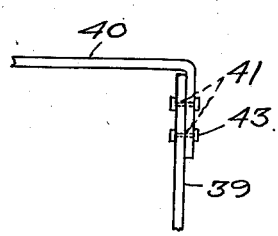
Figure 7 is an enlarged fragmentary detail of a corner joint.

In Figure 5 a bracket 45 is shown bolted to the bars 37 and 38 for greater strength. The construction of the wall units and partition units provides for windows and doors, wherever there are windows and doors wanted.

In Figure 8 the floor section 46 having the bar inserts 47 projecting in vertical holes 48 is ready to be bolted to the wall section 49, having the ledge 50 as a support for the floor section, and the upwardly projecting bar inserts 51 having the holes 52. The upper wall section 53 has the slots 54 with the downwardly projecting bar inserts 55 having the holes 56.

In connecting the three sections 46, 49 and 53, the floor section 46 is lifted over the projecting bar inserts 51 and rested on the ledge 50, the inserts 51 will then project upwardly from the vertical holes 48 of the floor section 46.

The angle bar inserts 47 of the floor sections 46 are now bolted to the angle bar inserts 51, the plaster finish 57 of the wall section 49 will now meet the plaster finish 58 of the ceiling (the under side of the floor section 46) at an angle of 45°, the insulation is shown by the numeral 59.

The upper wall section 53 is now connected to the wall section 49 and the floor section 46, by bolting the downwardly projecting bar inserts 55 to the inserts 51 of the wall section 49 and to the inserts 47 of the floor section 46. When the three sections are connected the wallboard 60 is secured to the lower end of the wall section 53, thereby concealing the different connections.

The different sections from the foundation 61 to the roof 62 are similarly connected through insert joint members as already described.

Figure 10:
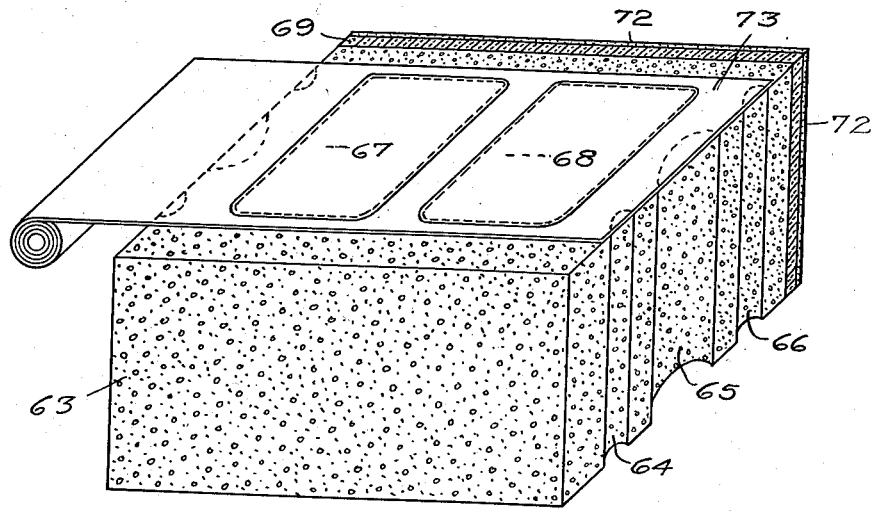
Figure 10 is a perspective view of a concrete block suitably insulated.
Figure 11:
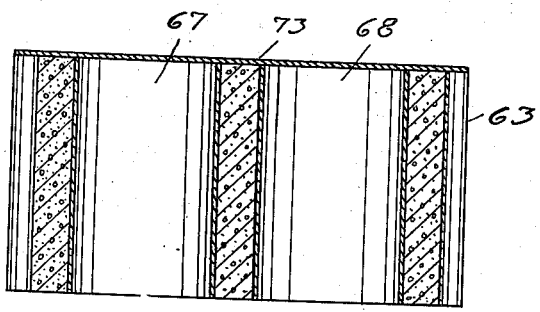
Figure 11 is a sectional view on line 11—11 in Figure 10.
Figure 12:
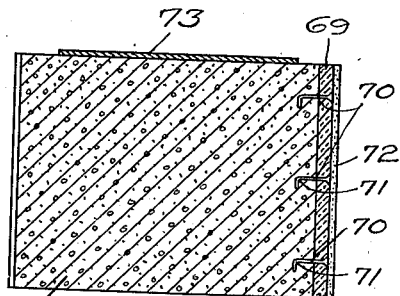
Figure 12 is a sectional view on the line 12—12 in Figure 10.
Figure 13:
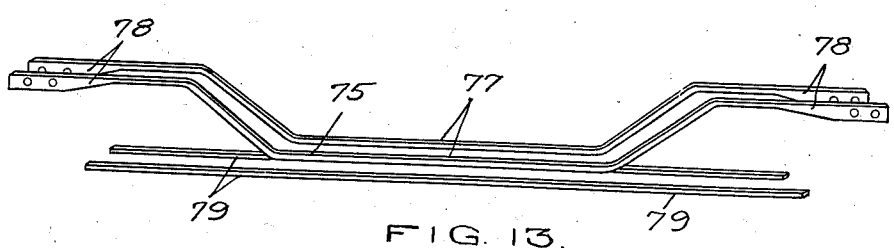
Figure 13 is a perspective view of the reinforcing rods used in the type of beams illustrated in Figures 15 and 16.

Figures 10, 11 and 12 show another form, the walls being formed of blocks 63, having the vertical grooves 64, 65 and 66 in the end surfaces. The block, having the vertical holes 67 and 68, is covered with tar paper and tar felt and has on its front side a layer of cork insulation 69, said cork insulation being fastened to the surface of the block by the nails 70, bent as shown at 71 and laid in the cement while soft, a facing of plaster 72 or other material finishes the block.

The tar paper and tar felt 73 laid in the groove 74 seals the vertical holes at their upper end to form air cells when these blocks are laid on top of one another to form a wall section. This construction prevents condensation on the inside of the block.

In Figures 13 to 16 inclusive a modified form of the invention is shown in which the connecting bars 75 are connected together at their inner ends to form a reinforcing bar 76 formed of a straight middle portion 77 terminating in oblique portions 78. The unit is further strengthened by the rods 79 below and parallel to the middle sections 77.

In Figure 14 floor sections are shown with the connecting bars 75 projecting from pockets 80.

The floor sections are completely made in the factory with the tile covering 81 or any other suitable surface.

The columns 82 have the reinforcing rods 83 with the link extensions 84 securely held thereto at one end and projecting in recesses 85 at the other.

The beams 86 reinforced with the bars 75 and rods 79 terminate in angular portions 86 provided with pockets 87 permitting access to the bars 75 which engage the adjoining beams through the holes 87.

The angular portions of the beams have recesses 88 for the links 84 projecting outwardly from the beams 86 and adapted to be bolted to the column above by the bolt 89.

Figure 18:
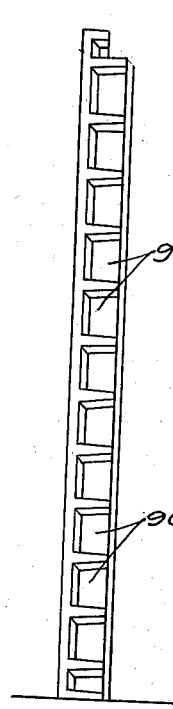
Figure 18 is a sectional view on the line 18—18 in Figure 17.
Figure 17:
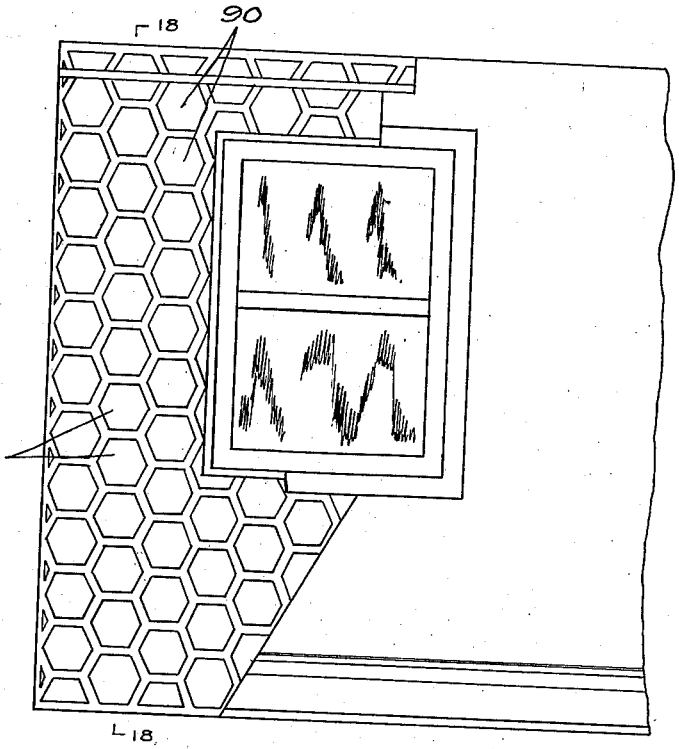
Figure 17 is an elevational view of a wall section partly broken away to show its construction.
Figure 19:
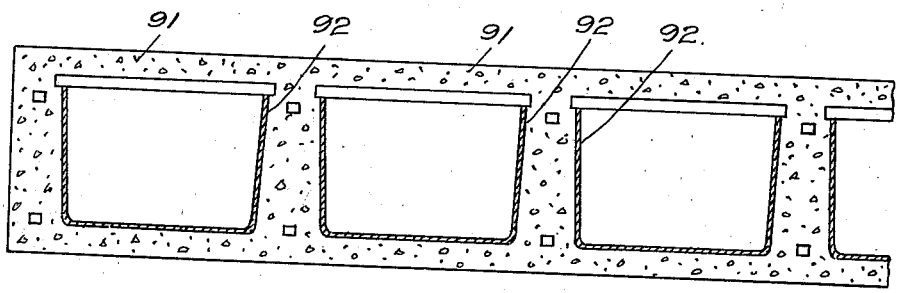
Figure 19 is a longitudinal cross sectional view of a floor section embodying the constructional features of the wall section illustrated in Figure 17.

Figures 17, 18 and 19 show a method of decreasing the weight of various units by forming hollow hexagonal pockets 90 the webs of which form a sort of honey comb construction. For greater strength or other considerations, the pockets can be made circular.

The construction of the floor unit 91 is very much similar to the construction of the wall unit illustrated in Figures 17 and 18 except for the reinforcing metal 92 covering the pockets and attached to the unit for the ceiling.

It is easily understood that a great number of modifications can be made to the various units, they can be made to represent elaborate masonry as shown in Figure 9. The units can be of various shapes and sizes such as the arches 91, the foundation walls 92, the railing 93, the wall sections 94 and the roof sections 95.

What I claim is:—

1. In truss beams, a series of beams having their ends tapered and pointed to a common center and abutting each other on the surfaces of the tapered end and having transverse apertures spaced intermediate of the length of the tapered ends and on the tapered surfaces communicating with the apertures of the abutting beams, coupling bars having flattened ends longitudinally set and bared from the tapered surfaces and projecting into the facing apertures and overlapping therein the coupling bars projected from the opposite beam, and bolts joining the ends of the overlapping coupling bars and incidently locking the abutting beams.

2. In truss beams, a series of beams having their ends tapered and pointed to a common center and abutting each other on the surfaces of the tapered end and having transverse apertures spaced intermediate of the length of the tapered ends, and on the tapered surfaces communicating with the apertures of the abutting beams, coupling bars having flattened ends longitudinally set and bared from the tapered surfaces and projecting into the facing apertures and overlapping therein the coupling bars projected from the opposite beam, bolts connecting the ends of the overlapping coupling bars, vertical bars anchored in the end of the said beams and projecting from the upper and lower surface thereof, columns having their corners bared, coupling bars in said columns having their ends exposed in the bared corners and overlapping the projecting anchor bars and bolts connecting the overlapped bars.

ROBERT WALDEMAR STENCEL.